No. 788,706. PATENTED MAY 2, 1905.
E. J. CORSER.
SPEED CHANGING MECHANISM FOR GRAIN DRILLS.
APPLICATION FILED NOV. 10, 1904.
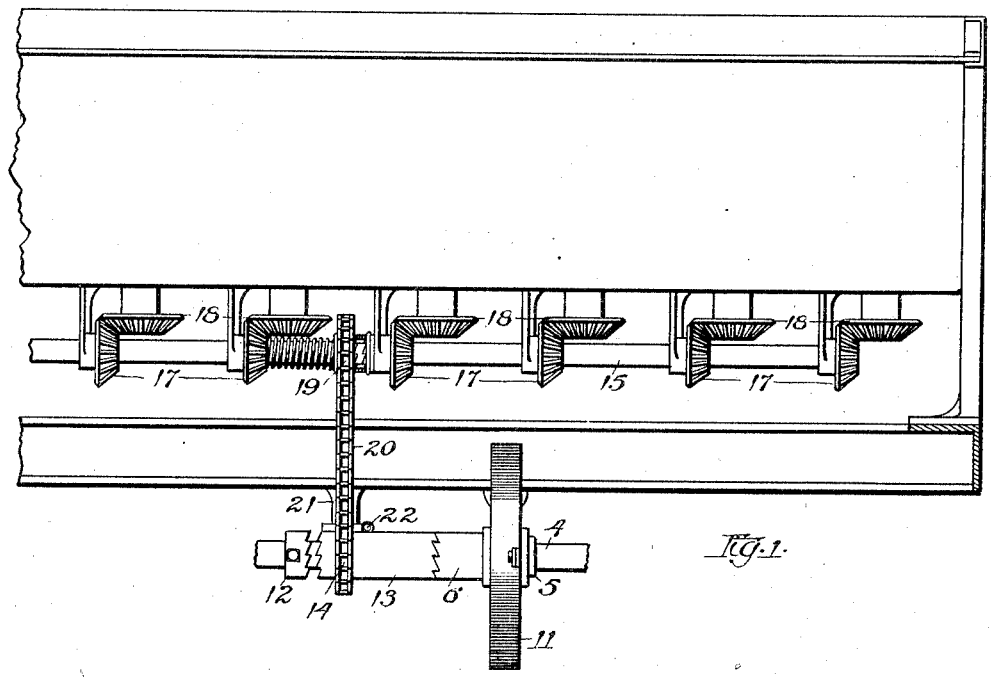
Fig. 1.
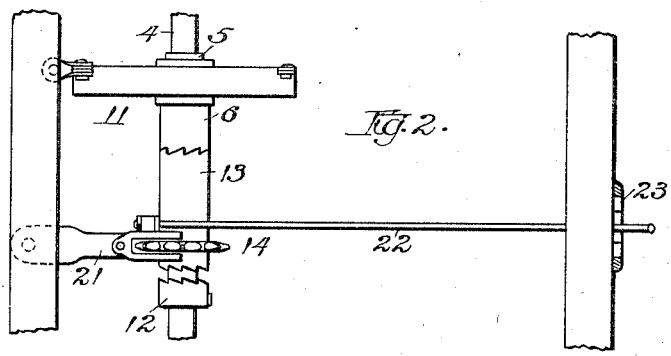
Fig. 2.
Fig. 3.
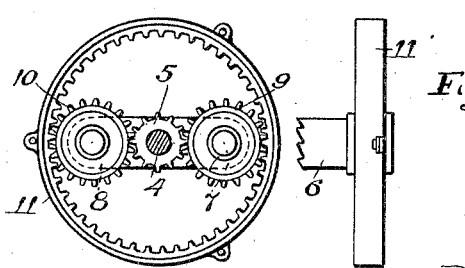
Fig. 4.
Witnesses:
Inventor
Edson J. Corser
By E. W. Burgess
Attorney No. 788,706. Patented May 2, 1905.

UNITED STATES PATENT OFFICE.

EDSON J. CORSER, OF MACEDON, NEW YORK, ASSIGNOR TO INTERNATIONAL HARVESTER COMPANY, A CORPORATION OF NEW JERSEY.

SPEED-CHANGING MECHANISM FOR GRAIN-DRILLS.

SPECIFICATION forming part of Letters Patent No. 788,706, dated May 2, 1905.

Application filed November 10, 1904. Serial No. 232,123.

*To all whom it may concern:*

Be it known that I, EDSON J. CORSER, a citizen of the United States, residing at Macedon, in the county of Wayne and State of New York, have invented certain new and useful Improvements in Speed - Changing Mechanism for Grain-Drills, of which the following is a specification, reference being had to the accompanying drawings, forming a part thereof.

My invention relates to speed-changing mechanism for grain-drills, and is especially designed to be used in connection with a fertilizer-distributer when used as an attachment for the above class of machines, as shown in my application having Serial No. 223,330, filed September 6, 1904.

The object of the invention is to provide a mechanism for changing the speed of the distributing devices, which, operating in connection with other means, will afford a greater range relative to the quantity of material distributed.

The construction and operation of the device will be more clearly described in the specification and illustrated by the drawings accompanying this application, in which—

Figure 1 represents a rear elevation of so much of a machine of the above-noted class sufficient to illustrate the application of my invention. Figs. 2, 3, and 4 are details of the same.

The same reference-numerals designate like parts throughout the various views.

In the drawings, 4 is the axle upon which the carrying-wheels (not shown) are suitably mounted, and the axle is caused to revolve thereby by means of any of the usual forms of ratchet-and-pawl mechanism. Secured to the axle 4 is a pinion 5, and loosely mounted thereon is a clutch member 6, having oppositely-disposed arms 7 and 8, and mounted upon said arms are the pinions 9 and 10. The mechanism would be operative if only one arm and one pinion be used; but it is considered preferable to use the double form, as a more equal balance of the mechanism is thereby obtained. Surrounding these parts is a casing 11, secured against rotation by being connected to a fixed part of the machine. The casing is provided with gear-teeth upon the inner side of its rim, with which the pinions 9 and 10 engage. The pinions also mesh with the pinion 5, secured to the axle. A second clutch member 12 is secured to the axle, and between this last-mentioned member and the clutch member 6 there is mounted a third clutch member 13, which is adapted to slide longitudinally upon the axle 4 and is provided with a sprocket-wheel 14, which is integral therewith. A shaft 15 is suitably journaled beneath the hopper 16 and has mounted thereon a series of bevel-pinions 17, meshing with a series 18, suitably journaled and with which the distributer-wheels are connected. A sprocket-wheel 19 is mounted upon the shaft 15 and is adapted to be clutched or unclutched therewith in a well-known manner. A driving-chain 20 passes around the two sprocket-wheels 14 and 19. Means are provided for moving the clutch member 13 into engagement with either the member 6 or the member 12, or it may be held in a neutral position. The means comprises the fork 21, embracing the sprocket-wheel 14 and having the lever 22 attached thereto, which extends rearward and is connected with a common form of sector-rack 23.

The mechanism operates in the following manner: With the clutch member 13 engaged with the clutch member 12 the sprocket-wheel 14 is driven by the same at equal speed. If it be desired to give the sprocket-wheel 14 a slower speed, the clutch member 13 is caused to engage with the member 6, which, carrying the pinions 9 and 10 on the arms 7 and 8, the pinions meshing with the teeth upon the casing 11 and also with the pinion 5, secured to the axle 4, the clutch member 13 is given a speed proportionate with the number of teeth upon the fixed rim and the pinion 5, the gearing comprising a form of what is commonly called the "planetary system."

What I claim, and desire to secure by Letters Patent, is—

1. In a machine of the class described, the combination of a main driving-shaft, a change-speed device comprising a pinion secured to said shaft, a fixed rim concentric with the shaft and provided with teeth upon its inner surface, an arm journaled on the shaft adjacent the pinion, a pinion journaled on said arm and meshing with the fixed pinion and the teeth upon the fixed rim, a gear member journaled on the shaft, and means for clutching said gear member with the shaft or with the arm journaled thereon.

2. In a machine of the class described, the combination of a driving-shaft, a change-speed device comprising a pinion secured to said shaft, a rim secured concentric with the shaft and provided with teeth upon its inner surface, a clutch member rotatably mounted on the shaft, one or more pinions journaled thereon, said pinions meshing with the teeth on the rim and the pinion on the shaft, a clutch member secured to the shaft, a clutch member slidably mounted upon the shaft between the first-mentioned clutch members, and means for sliding said clutch member to engage with either of the other members.

3. In a machine of the class described, a speed-changing mechanism comprising a main shaft, a planet-pinion, an arm rotatably mounted on said main shaft, said pinion journaled on said arm, a pinion secured to said shaft, a toothed rim concentric with said shaft and secured against rotation, said planet-pinion meshing with the toothed rim and the pinion secured to the axle, the rotatable arm having clutch-teeth, a collar secured to the axle and provided with clutch-teeth, a sprocket-wheel slidably mounted upon said main shaft between said collar and said arm and provided with clutch-teeth upon opposite ends of its hub portion, and means for holding the sprocket-wheel on the main shaft in engagement with either the rotatable arm, the fixed collar, or in a neutral position.

In witness whereof I hereto affix my signature in presence of two witnesses.

EDSON J. CORSER.

Witnesses:
MARGARET A. SWEENEY,
T. H. ALFREDO.